United States Patent [11] 3,564,283

[72] Inventor Thomas H. Bladen
Adelphi, Md.
[21] Appl. No. 762,664
[22] Filed Sept. 25, 1968
[45] Patented Feb. 16, 1971
[73] Assignee the United States of America as represented by the Secretary of the Navy

[54] ANALOG FEEDBACK CIRCUIT
8 Claims, 2 Drawing Figs.

[52] U.S. Cl. 307/229; 307/214; 307/304
[51] Int. Cl. G06g 7/14
[50] Field of Search 307/229, 230, 232, 304; 328/133, 155; 235/194

[56] References Cited

UNITED STATES PATENTS

| | | | |
|---|---|---|---|
| 3,031,142 | 4/1962 | Cohen et al. | 307/229X |
| 3,117,242 | 1/1964 | Slack | 307/229 |
| 3,293,424 | 12/1966 | Fisher | 307/229X |

*Primary Examiner*—Roy Lake
*Assistant Examiner*—James B. Mullins
*Attorneys*—J. P. Dunlavey and J. O. Tresansky ABSTRACT: An analog feedback circuit for producing a null or zero output for two either in-phase or 180° out-of-phase input signals applied to the circuit. The first input signal is applied to a first field-effect-transistor variable summing impedance circuit and an inversion thereof is simultaneously applied to a second and complimentary field-effect-transistor variable summing impedance circuit. The second input signal is applied to a third field-effect-transistor constant summing impedance circuit. The outputs of the first and second variable summing impedance circuits are controlled by a DC signal so that when combined with the output of the constant third summing impedance circuit in an operational summing amplifier a null or zero output is obtained.

Thomas H. Bladen
INVENTOR

BY J. O. Tresansky
ATTORNEY

ANALOG FEEDBACK CIRCUIT

BACKGROUND OF THE INVENTION

This invention relates generally to analogue feedback circuits and more particularly to an analogue feedback circuit using field effect transistors as variable impedance elements.

Analogue feedback circuits are used to continuously produce an operational null point output for any two input signals which are either in phase or 180° out of phase. In the past, one type of analogue feedback circuit employed varistor semiconductors for the variable resistance elements therein. Though generally satisfactory, the prior art varistor analogue feedback circuits were somewhat unstable and noisy. In addition, they tended to be nonlinear in operation and to lack a large dynamic signal range. Another type of analogue feedback circuit employed raysistor semiconductors as the variable resistance elements therein. Again, while generally satisfactory, the raysistor type analogue feedback device was somewhat unstable and lacked adequate temperature stability.

It has been discovered that the above noted inadequacies of the prior art analogue feedback circuits are improved by the use of complementary field effect transistors as the variable resistance elements therein.

SUMMARY OF THE INVENTION

Accordingly, one object of this invention is to provide a new and improved analogue feedback circuit.

Another object of this invention is the provision of a new and improved analogue feedback circuit using complementary field effect semiconductor active circuit elements.

Still another object of the present invention is the provision of a new and improved field effect transistor analogue feedback circuit which is linear, has a large dynamic signal range, and is insensitive to temperature variations.

Briefly, in accordance with one embodiment of this invention, these and other objects are attained by operationally summing through two variable summing impedances a first analogue voltage signal and the inversion thereof with a second analogue voltage signal passed through a constant summing impedance. The two variable summing impedances are selectively varied by a DC control signal having a polarity and magnitude corresponding to the polarity and amplitude differences of the two input signals until a null output results from the operational summing amplifier.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DETAILED DESCRIPTION OF THE PREFERRED EMBODIMENT

Figure 1:
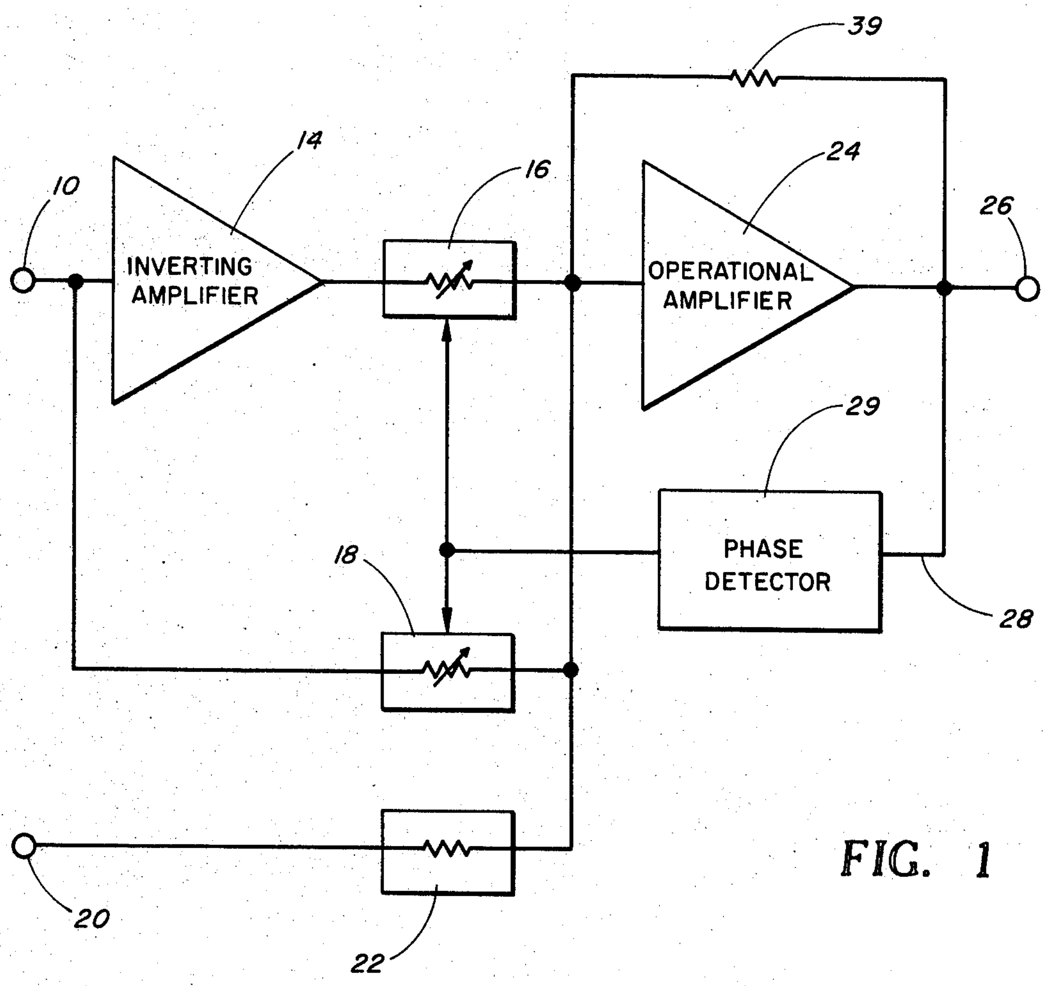
FIG. 1 is a block diagrammatic view of the designate analogue feedback circuit in accordance with the present invention.

Referring now to the drawings wherein like reference characters designate identical or corresponding parts throughout the several views, and more particularly to FIG. 1 thereof wherein the overall analogue feedback circuit is shown as having a first input terminal 10 for application of a first analogue voltage signal. The first analogue voltage signal is applied to an inverting amplifier 14 and then to a variable summing impedance circuit 16. The first analogue voltage signal is simultaneously applied to a variable summing impedance circuit 18. A second input terminal 20 provides for application of a second analogue voltage signal which is either in phase or 180° out of phase with the first analogue voltage signal and is to be nulled therewith. The second analogue voltage signal is applied to a constant summing impedance circuit 22. The outputs from the three summing impedance circuits 16, 18 and 22 are then applied to and added in a conventional operational amplifier 24 such, for example, as a Fairchild Model UA709 microcircuit type, while proper control adjustments, as will hereinafter be explained more fully, are made until a zero or null output appears at output terminal 26. A feedback resistor 39 controls the gain of the operational amplifier 24 to provide an optimum output level. A feedback path 28 which may include a phase detector 29 is connected between output terminal 26 and varying impedance circuits 16 and 18 to develop a DC control voltage of positive or negative polarity depending upon the relative amplitude and phase of the first and second analogue voltage input signals for oppositely varying the effective magnitude of each of summing impedances 16 and 18 whereby either the inverted or original representation of the first input signal will be algebraically added to the second input signal in operational amplifier 24. The variable effective magnitude of summing impedances 16 and 18 also provide matching of the amplitude of the first and second analogue voltage signals to produce the desired nulling effect. It should be understood that if the analogue voltage input signals applied to input terminals 10 and 20 are continuously changing that the DC control voltage developed by feedback circuit 28 will allow for a nulled or zero output signal at output terminal 26 to be continuously and automatically maintained. However, it should further be understood that the invention is not so limited and that a variable DC control voltage may be provided by other means, such for example, as a manually operated selective switch connected across a DC supply.

Figure 2:
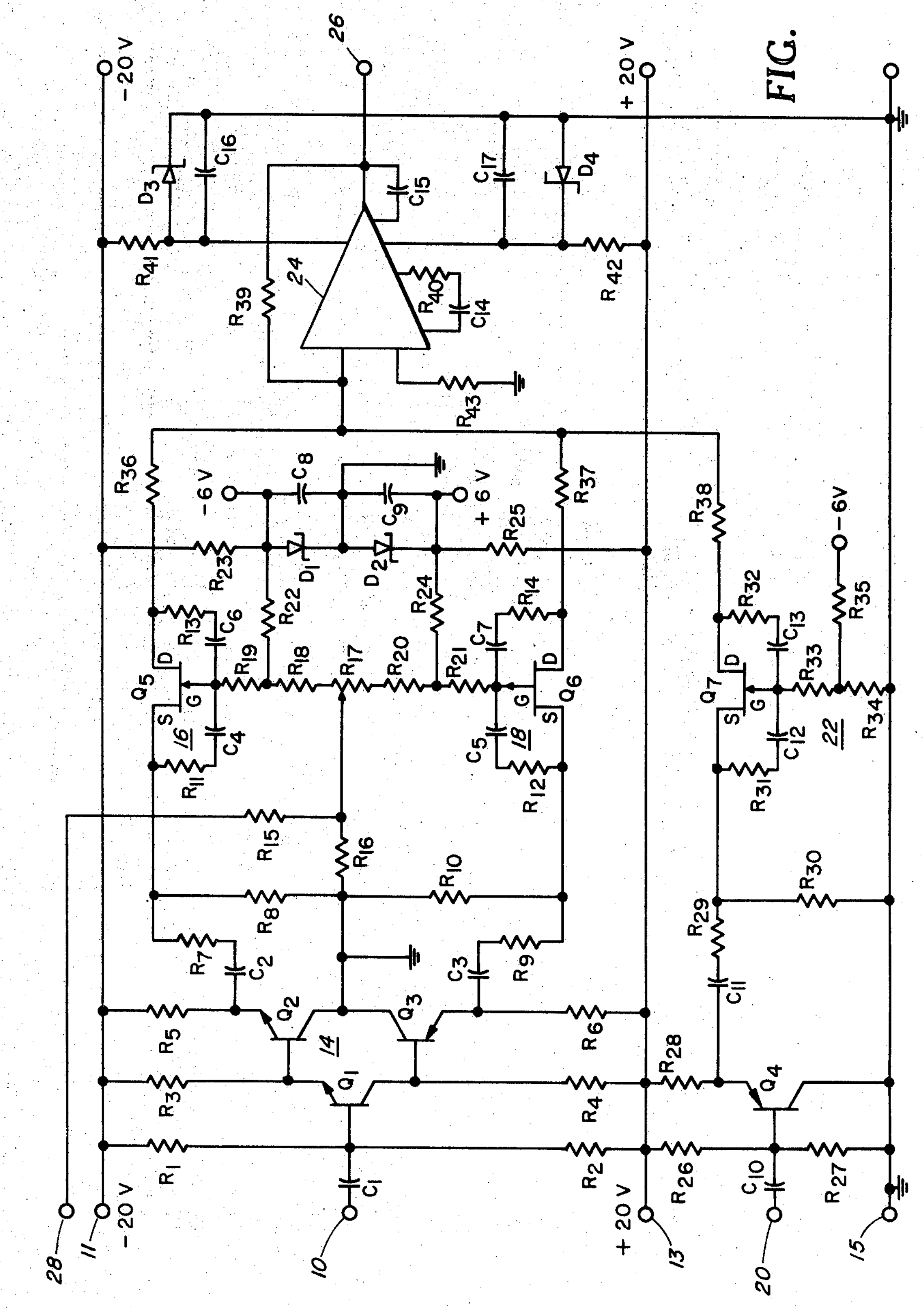
FIG. 2 is a detailed schematic diagram of a particular embodiment of the analogue feedback device in accordance with the present invention.

Referring now to the more detailed schematic diagram of FIG. 2, the first analogue voltage signal applied to terminal 10 is shown as fed through a coupling capacitor $C_1$ to the base electrode of a transistor $Q_1$ which forms a portion of a conventional polarity inverting amplifier circuit which consists additionally of transistors $Q_2$ and $Q_3$. A replica of the first analogue voltage signal will appear at the emitter electrode of transistor $Q_1$ and is applied to the base electrode of a transistor $Q_2$ connected in an emitter follower configuration. An inversion of the first analogue voltage signal simultaneously appearing at the collector electrode of transistor $Q_1$ is applied to the base electrode of transistor $Q_3$ also connected in an emitter follower configuration. Transistors $Q_1$, $Q_2$ and $Q_3$ may be respectively, for example, conventional silicon bipolar transistors 2N1711, 2N1711 and 2N2905. Appropriate operational bias is provided for transistor $Q_1$ by connection of its base electrode to the juncture of resistors $R_1$ and $R_2$ which in turn are connected across an appropriate centrally grounded DC voltage supply source via terminals 11 and 13. Suitable loading is provided for transistor $Q_1$ by connection of its emitter and collector electrodes through respective resistors $R_3$ and $R_4$ across the voltage supply source. The emitters of transistors $Q_2$ and $Q_3$ are connected across the voltage supply source through load resistors $R_5$ and $R_6$ respectively.

The replica of the first input signal appearing at the emitter of transistor $Q_2$ is coupled through capacitor $C_2$ to the source terminal of a variable summing impedance field effect transistor $Q_5$. In like fashion, the inversion of the first input signal appearing at the emitter of transistor $Q_3$ is applied through a coupling capacitor $C_3$ to the source terminal of a complimentary variable summing impedance field effect transistor $Q_6$. Efficient signal transmission to the field effect transistors $Q_5$ and $Q_6$ is effected by the low impedance outputs of emitter follower connected transistors $Q_2$ and $Q_3$. Field effect transistors $Q_5$ and $Q_6$ are both inherently stable and quiet and may be, for example, conventional and matched N channel 2N4340 and P channel FP4340 transistors, respectively. Resistance networks formed of resistors $R_7$–$R_8$ and resistors $R_9$–$R_{10}$ are interposed between the collector terminals of transistors $Q_2$ and $Q_3$ and the source terminals of field effect transistors $Q_5$ and $Q_6$ to increase the linearity of the control voltage characteristics of the analogue feedback circuit and to hold the source terminals at DC ground potential. The R–C networks formed of resistor $R_{11}$ and capacitor $C_4$ and resistor $R_{12}$ and capacitor $C_5$ are connected between the source and gate terminals of field effect transistors $Q_5$ and $Q_6$, respectively, to increase the linearity of the analogue feedback circuit to satisfactorily respond to large dynamic signal inputs applied thereto. Similarly, R–C networks formed of resistor $R_{13}$ and capacitor $C_6$ and resistor $R_{14}$ and capacitor $C_7$ are connected between the drain and gate terminals of field effect transistors $Q_5$ and $Q_6$, respectively, to increase the linearity of the analogue feedback circuit to satisfactorily respond to large dynamic signal inputs.

Initially both field effect transistors $Q_5$ and $Q_6$ are biased to operate at the same level below the pinchoff voltage point by the feedback control voltage applied to the center tap of a potentiometer $R_{17}$ serially connected at an intermediate point in a voltage divider network formed of resistors $R_{17}$ to $R_{21}$ connected between the gate terminals of transistors $Q_5$ and $Q_6$. Under such a condition, the field effect transistors $Q_5$ and $Q_6$ will provide equal and opposing effect summing impedances 16 and 18 which in the absence of a second input signal will produce, in effect, a balanced bridge condition so that a null or zero output will appear at output terminal 26. This initial balanced and nulled condition is further assured by varying the resistance of potentiometer $R_{17}$ until a balance in the parameters of the field effect transistors $Q_5$ and $Q_6$ is effected. With the circuit balanced, if a positive DC control voltage is applied, the bias of the N channel field effect transistor $Q_5$ will be decreased and the bias of the P channel field effect transistor will be simultaneously increased. This causes the summing impedance field effect transistor $Q_5$ to act as a lower resistance and the summing impedance field effect transistor $Q_6$ to act as a large resistance thereby unbalancing the bridge arrangement and causing a positive output signal to be developed at the output terminal 26 in the absence of the application of a second signal to input terminal 20. In turn, if a negative DC control voltage is applied an equal but opposite bridge unbalance will be effected and an inverted output signal will appear at output terminal 26 in the absence of a second signal applied to input terminal 20. Resistor $R_{15}$ of the feedback circuit 28 is connected to potentiometer $R_{17}$ and to DC ground through a resistor $R_{16}$ to suitably reduce the level of the DC control voltage for proper biasing of the field effect transistors $Q_5$ and $Q_6$.

Appropriate regulated bias supply voltages may be provided for field effect transistors $Q_5$ and $Q_6$ from DC voltage supply terminals 11 and 13 by a divider network thereacross composed of serially connected resistors $R_{23}$ and $R_{25}$ and back-to-back connected diodes $D_1$ and $D_2$, whose common juncture is connected to ground. Capacitors $C_8$ and $C_9$ connected across diodes $D_1$ and $D_2$, respectively, serve to filter out any ripple voltages appearing across the respective diodes. The bias voltages are applied to the gate electrodes through isolation resistors $R_{22}$ and $R_{24}$ connected respectively to the juncture of resistors $R_{18}$–$R_{19}$ and resistors $R_{20}$–$R_{21}$.

The second analogue voltage input signal applied to input terminal 20 is coupled through a capacitor $C_{10}$ to the base of a transistor $Q_4$ operating as an emitter follower. Appropriate bias is provided for transistor $Q_4$ by connecting the base thereof to the juncture of resistors $R_{26}$ and $R_{27}$ connected across the negative voltage supply terminal 13 and the ground terminal 15 to which the center tap of the voltage supply is connected. Resistor $R_{28}$ connected between the emitter electrode of transistor $Q_4$ and the supply voltage terminal 13 provides a proper load for transistor $Q_4$. Transistor $Q_4$ may be, for example, a conventional 2N2905 transistor. The output signal of transistor $Q_4$ appearing at the emitter electrode thereof is applied via capacitor $C_{11}$ to the source terminal of a third N channel field effect transistor $Q_7$ which provides a constant summing impedance 22. The N channel field effect transistor $Q_7$ may be, for example, an N channel 2N4340. A resistor $R_{29}$, connected between capacitor $C_{11}$ and the source terminal of field effect transistor $Q_7$, and resistor $R_{30}$, connected between the source terminal of field effect transistor $Q_7$ and ground, provides for an optimum output level to be obtained from summing impedance field effect transistor $Q_7$. Again, R–C networks of resistor $R_{31}$ and capacitor $C_{12}$ and resistor $R_{32}$ and capacitor $C_{13}$, connected respectively between the source and gate terminals and the drain and gate terminals of field effect transistor $Q_7$, insure greater linearity of operation and reduction of signal distortion from large dynamic signals. A voltage divider formed of resistors $R_{33}$, $R_{34}$ and $R_{35}$ provides a proper bias voltage to the gate terminal of field effect transistor $Q_7$ from an appropriate bias supply source such as that supplying bias to field effect transistor $Q_6$.

Understanding that a nulled or zero output is desired at output terminal 26, the DC control voltage developed by phase detector 29 in feedback loop 28 will vary in phase and amplitude depending upon the results of the algebraic addition of operational amplifier 24 on the input signals applied thereto through resistors $R_{36}$, $R_{37}$ and $R_{38}$ until the output voltages across field effect transistor summing impedances $Q_5$, $Q_6$ and $Q_7$, total zero at the output terminal 26. Resistors $R_{36}$, $R_{37}$ and $R_{38}$ serve to maintain the control characteristics of the field effect transistors $Q_5$, $Q_6$ and $Q_7$ more linear, respectively. Capacitor $C_{14}$ and resistor $R_{40}$ are connected in a conventional manner to the input circuit of the operational amplifier 24 to provide frequency compensation thereto. Likewise, capacitor $C_{15}$ is connected in a conventional manner to the output circuit of operational amplifier 24 to provide frequency compensation thereto.

It should be understood that since operational amplifier 24 is being operated in a conventional single ended fashion that the second input thereto has been grounded in a conventional manner through a resistor $R_{43}$. Resistors $R_{41}$ and $R_{42}$ connected between the operational amplifier 24 and supply voltage terminals 11 and 13, respectively, are voltage dropping resistors which supply proper biasing voltages to the operational amplifier 24. Diodes $D_3$ and $D_4$ connected between the operational amplifier 24 and ground terminal 15 provide regulation for the bias voltages applied to operational amplifier 24, while capacitors $C_{16}$ and $C_{17}$ connected, respectively, in parallel across diodes $D_3$ and $D_4$ filter out any ripple appearing thereacross.

It should be apparent that the instant analogue feedback circuit employing complementary field effect transistors as variable impedance elements provides a circuit which is stable, quiet, exhibits linear operation over a large dynamic signal range, and has good temperature stability.

Obviously, numerous modifications and variations of the present invention are possible in the light of the above teachings. It is therefore to be understood that within the scope of the appended claims the invention may be practiced otherwise than as specifically described herein.

I claim:

1. An analogue feedback circuit comprising:
first summing impedance means of variable impedance for receiving a first analogue voltage input signal and for providing an analogue output therefrom;
means for inverting said first analogue voltage input signal;
second summing impedance means of variable impedance for receiving said inverted first analogue voltage input signal simultaneously with the receiving of said first analogue voltage input signal by said first summing impedance means and for providing an analogue output therefrom;
third summing impedance means for receiving a second analogue voltage input signal of either in phase or 180° out of phase relationship with said first analogue voltage input signal and for providing an analogue output therefrom;
means for operationally summing said analogue outputs from said first, second and third summing impedances; and means for continuously providing a nulled or zero output from said operational summing means by controlling said analogue outputs of said first and said second summing impedance means.

2. An analogue feedback circuit as in claim 1 wherein each of said summing impedance means includes a field effect transistor.

3. An analogue feedback circuit as in claim 1 wherein said first summing impedance means and said second summing impedance means includes complementary field effect transistors.

4. An analogue feedback circuit as in claim 3 wherein said inverting means includes at least three silicon bipolar transistors.

5. An analogue feedback circuit as in claim 2 wherein said means for operationally summing includes an operational amplifier.

6. An analogue feedback circuit as in claim 1 wherein said third summing impedance means is of constant impedance.

7. An analogue feedback circuit as in claim 3 wherein said means for continuously providing a nulled or zero output includes a variable voltage divider connected between the respective gates of said complementary field effect transistors and a variable DC voltage source, said DC voltage source being applied to said variable voltage divider.

8. An analogue feedback circuit as in claim 3 wherein said means for continuously providing a nulled or zero output includes a variable voltage divider connected between the respective gates of said complementary field effect transistors and means for feeding back the output of said operational summing means to said variable voltage divider.